(12) United States Patent
Bakker et al.

(10) Patent No.: US 9,526,045 B2
(45) Date of Patent: Dec. 20, 2016

(54) CALL DROP AVOIDANCE DURING RADIO LINK FAILURE

(71) Applicant: Alcatel Lucent, Boulogne Billancourt (FR)

(72) Inventors: Hajo-Erich Bakker, Eberdingen (DE); Lutz Ewe, Stuttgart (DE); Siegfried Klein, Stuttgart (DE); Ulrich Barth, Korntal-Munchingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 255 days.

(21) Appl. No.: 14/358,153

(22) PCT Filed: Nov. 5, 2012

(86) PCT No.: PCT/EP2012/071797
§ 371 (c)(1),
(2) Date: May 14, 2014

(87) PCT Pub. No.: WO2013/072204
PCT Pub. Date: May 23, 2013

(65) Prior Publication Data
US 2014/0321430 A1  Oct. 30, 2014

(30) Foreign Application Priority Data
Nov. 14, 2011  (EP) ..................... 11306474

(51) Int. Cl.
*H04W 36/00* (2009.01)
*H04W 76/02* (2009.01)
*H04W 76/04* (2009.01)

(52) U.S. Cl.
CPC ..... *H04W 36/0072* (2013.01); *H04W 36/0033* (2013.01); *H04W 76/028* (2013.01); *H04W 76/046* (2013.01)

(58) Field of Classification Search
None
See application file for complete search history.

(56) References Cited

U.S. PATENT DOCUMENTS 6,876,640 B1 *  4/2005  Bertrand ........... H04W 36/0033
                                                  370/331
2007/0230399 A1  10/2007  Oswal et al.
(Continued)

FOREIGN PATENT DOCUMENTS

| JP | 2011-009798 | 1/2011 |
| KR | 10-2007-0021303 | 2/2007 |

(Continued)

OTHER PUBLICATIONS

International Search Report for PCT/EP2012/071797 dated Mar. 5, 2013.

*Primary Examiner* — Andrew Lai
*Assistant Examiner* — Jamaal Henson
(74) *Attorney, Agent, or Firm* — Fay Sharpe, LLP (57) ABSTRACT

The present invention relates to a radio resource controller (220a) for controlling radio resources of a serving radio access node (100a). The controller is configured to assign particular radio resources of the serving radio access node to a radio communication session established between the serving radio access node and a particular mobile station, and to push session information (UE_id; UE_ctx_ptr) of the radio communication session into a common data repository (320) accessible to a further radio resource controller (220b) controlling radio resources of a further radio access node (100b). The session information comprise a mobile identifier (UE_id) that may be used by the particular mobile station for resumption of the radio communication session, and further allow retrieval of contextual communication parameters (UE_ctx) used by the serving radio access node for radio communication with the particular mobile station during the (Continued)

radio communication session. The radio resource controller and the further radio resource controller would run on a common computer platform as two respective process instances. The computer platform would further hold the common data repository.

5 Claims, 4 Drawing Sheets

(56) References Cited

U.S. PATENT DOCUMENTS

| | | | |
|---|---|---|---|
| 2008/0268844 A1 | 10/2008 | Ma et al. | |
| 2011/0080891 A1* | 4/2011 | Cai | H04W 36/0033 370/331 |
| 2013/0182555 A1* | 7/2013 | Raaf | H04W 36/0033 370/216 |

FOREIGN PATENT DOCUMENTS

| | | |
|---|---|---|
| WO | WO 2009/057449 | 5/2009 |
| WO | WO 2011/015248 A1 | 2/2011 |

* cited by examiner

CALL DROP AVOIDANCE DURING RADIO LINK FAILURE

TECHNICAL FIELD OF THE INVENTION

The present invention relates to connection re-establishment within a mobile communication network.

TECHNICAL BACKGROUND OF THE INVENTION

Handover is the process of transferring an ongoing radio communication session, being a voice call, a video call or any kind of user data exchange, from a serving cell, also referred to as the source cell, towards a new better-suited cell, also referred to as the target cell. For instance, as a mobile station is moving away from the coverage area of a serving cell, the radio signal from that serving cell weakens while the radio signal from another better-suited cell strengthens. When the difference in received signal powers between the two cells is past a predetermined threshold, a handover towards the better-suited cell is triggered.

For Long Term Evolution (LTE) mobile networks, an overview of the handover procedure and related message exchanges is described in §10.1.2 of the Technical Specification (TS) entitled "*Evolved Universal Terrestrial Radio Access (E-UTRA) and Evolved Universal Terrestrial Radio Access Network (E-UTRAN); Overall description*", published by the 3rd Generation Partnership Project (3GPP) in June 2009, ref. 3GPP TS 36.300 V9.0.0.

In a first step, the source evolved-NodeB (eNB) configures the User Equipment (UE) measurement policy, e.g. the UE is configured to send MEASUREMENT REPORT on a regular basis and/or as soon as a handover event is detected. The measurement reporting period and/or the handover parameters for detecting the handover condition are transmitted by the serving eNB.

In a second step, the source eNB makes a decision to hand off the UE based on the MEASUREMENT REPORT message(s) received from the UE and/or on Radio Resource Management (RRM) criterion. The source eNB either issues a HANDOVER REQUEST message directly to the target eNB, or a HANDOVER REQUIRED message to the Mobile Management Entity (MME) which is relayed towards the target eNB as a HANDOVER REQUEST message, passing necessary information to prepare the handover at the target side, including the UE signaling context and the UE data service context.

In a third step, the target eNB configures the required radio resources, and optionally reserves a Random Access CHannel (RACH) preamble. The target eNB acknowledges the handover request by either sending back a HANDOVER REQUEST ACKNOWLEDGE message directly to the source eNB, or a HANDOVER REQUEST ACKNOWLEDGE message to the MME which is relayed towards the source eNB as a HANDOVER COMMAND message. The HANDOVER REQUEST ACKNOWLEDGE or the HANDOVER COMMAND message includes an Radio Resource Control (RRC) container, namely an RRC CONNECTION RECONFIGURATION message, to be transparently passed by the source eNB to the UE.

In a fourth step, the UE receives the RRC CONNECTION RECONFIGURATION message with necessary communication parameters to switch to the target cell. The UE performs synchronization to the target eNB and accesses the target cell via RACH, following a contention-free procedure if a dedicated RACH preamble was reserved, or following a contention-based procedure if no dedicated preamble was indicated.

In a fifth step, the target eNB responds with uplink allocation and timing advance value. When the UE has successfully accessed the target cell, the UE sends the RRC CONNECTION RECONFIGURATION COMPLETE message to the target eNB. The target eNB can now send/receive data to/from the UE.

In a sixth and last step, the target eNB informs the source eNB about the success of the handover procedure by sending a UE CONTEXT RELEASE message, which triggers the release of the radio resources by the source eNB.

In case of non-optimal handover parameter settings, high load in the surrounding cells or fast fading situations (e.g., tunnel road), handover signaling messages may be lost. For instance, the MEASUREMENT REPORT message sent by the UE upon detection of an handover condition may not reach the source eNB, meaning no target eNB is prepared to accept this UE. Sill for instance, the UE may not receive the HANDOVER COMMAND message sent by the source eNB, yet the target eNB is prepared to resume communication with this UE if required.

The Radio Link Failure (RLF) procedure as described in §10.1.6 of TS 36.300 allows a UE to resume communication with a prepared eNB, meaning an eNB which has admitted the UE during an earlier executed handover preparation phase.

If the receive signal is past an RLF threshold and radio connection gets lost with the serving eNB, then the UE tries during a first phase to resume first communication with the serving cell of the serving eNB. If so, the communication resumes as if no radio problem occurs. If the UE is unable to resume communication with the serving cell during the first phase, then the UE enters the RLF state and tries during a second phase to connect to the target cell or another cell which offers the best radio link quality, e.g. another cell of the serving eNB, by means of a RRC CONNECTION REESTABLISHMENT REQUEST message.

In the second phase, in order to resume activity and avoid going through RRC_IDLE, the following procedure applies:
  The UE stays in RRC_CONNECTED.
  The UE accesses the cell through the random access procedure;
  The UE identifier used in the random access procedure for contention resolution, i.e. the Cell Radio Network Temporary Identifier (C-RNTI) of the UE in the serving cell where the RLF occurred+the Physical Cell Identity (PCI) of that serving cell+the short Message Authentication Code (short MAC-I) based on the encryption keys of that serving cell, is used by the selected eNB to authenticate the UE and check whether it has a context stored for that UE.
  If the eNB finds a context that matches the identity of the UE, that is to say if the ENB has been prepared for that UE, the RRC connection can be resumed.
  If no context is found, that is to say if the ENB was not prepared for that UE, the current RRC connection is released and the UE goes back to RRC_IDLE state (i.e., call is dropped).

SUMMARY OF THE INVENTION

It is an object of the present invention to improve success rate of connection re-establishment procedures within a mobile communication network.

In accordance with a first aspect of the invention, a radio resource controller for controlling radio resources of a serving radio access node is configured to assign particular radio resources of the serving radio access node to a radio communication session established between the serving radio access node and a particular mobile station.

The radio resource controller is further configured to push session information of the radio communication session into a common data repository accessible to a further radio resource controller controlling radio resources of a further radio access node. The session information comprise a mobile identifier that may be used by the particular mobile station for resumption of the radio communication session, and the session information further allow retrieval of contextual communication parameters used by the serving radio access node for radio communication with the particular mobile station during the radio communication session.

In accordance with a second aspect of the invention, a method for controlling radio resources of a serving radio access node comprises the step of assigning particular radio resources of the serving radio access node to a radio communication session established between the serving radio access node and a particular mobile station.

The method further comprises the step of pushing session information of the radio communication session into a common data repository accessible to a further radio resource controller controlling radio resources of a further radio access node. The session information comprise a mobile identifier that may be used by the particular mobile station for resumption of the radio communication session, and the session information further allow retrieval of contextual communication parameters used by the serving radio access node for radio communication with the particular mobile station during the radio communication session.

In accordance with a third aspect of the invention, a radio resource controller for controlling radio resources of a radio access node is configured to receive a reconnection request whereby a particular mobile station tries to resume a radio communication session previously established with a serving radio access node, and to decode a mobile identifier of the particular mobile station from the reconnection request.

The radio resource controller is further configured, in the absence of contextual information associated with the mobile identifier, to query a common data repository with the mobile identifier in order to retrieve contextual communication parameters used by the serving radio access node for radio communication with the particular mobile station during the radio communication session, and to resume the radio communication session with the particular mobile station using the so-retrieved communication parameters.

In accordance with a fourth aspect of the invention, a method for controlling radio resources of a radio access node comprises the steps of receiving a reconnection request whereby a particular mobile station tries to resume a radio communication session previously established with a serving radio access node, and decoding a mobile identifier of the particular mobile station from the reconnection request.

The method further comprises the steps of, in the absence of contextual information associated with the mobile identifier, querying a common data repository with the mobile identifier in order to retrieve contextual communication parameters used by the serving radio access node for radio communication with the particular mobile station during the radio communication session, and resuming the radio communication session with the particular mobile station using the so-retrieved communication parameters.

In accordance with a fifth aspect of the invention, a radio resource controlling arrangement comprises a computer platform configured to run the radio resource controller and the further radio resource controller as two respective process instances. The computer platform further holds the common data repository.

In one embodiment of the invention, the serving radio access node pushes the session information into the common data repository upon establishment of the radio communication session with the particular mobile station.

In one embodiment of the invention, the serving radio access node pushes the session information into the common data repository upon detection of a handover condition for the particular mobile station.

In one embodiment of the invention, the radio resource controller and the further radio resource controller share a common address space, and the session information further comprise a memory pointer towards a memory area of the common address space wherein the contextual communication parameters are stored by the radio resource controller.

It is envisioned to move generic radio access node functions that are not tied to a specific hardware and that are not bound by specific latency requirements, such as inter alia radio resource control or radio access node management, towards a generic computer platform. The computer platform may comprise more than one computer, and may encompass any kind of processor or computer arrangement that provides a single virtual execution environment (cloud computing).

Each physical radio access nodes would then be remotely controlled by a corresponding virtual radio access node running on the computer platform, and comprising the aforementioned generic functions instantiated on a per node basis as specific process instances. This scheme allows equipment size reduction for radio access nodes, and reduces Capital and Operational Expenditures (CAPEX and OPEX) as well as the ecological footprint of mobile communication networks.

With this concept, a pooling of resources is possible, in contrast to the current network deployment with individual radio access nodes, each with its own baseband, user plane and control plane processing.

As soon as a handover condition is fulfilled for a particular UE, the UE context is pushed into a common database that is accessible to all the virtual eNBs running on that computer platform. The UE context comprises the UE identifier that the UE may use for RRC connection re-establishment if any (e.g., C-RNTI+PCI+Short MAC-I in the serving cell), the number and individual characteristics of the radio bearer connections, etc. The database thus holds the UE contexts of all uEs for which an handover procedure is on-going. The UE context is deleted from the database as soon as the handover procedure successfully completes, and/or after some aging timer expires.

Alternatively, and depending on the memory capacity of the computer platform, the UE context can be pushed once the UE enters the RRC_Connected state, meaning the database holds the UE contexts of all active UEs.

If a UE, following an RLF, tries to resume the RRC connection with a further eNB, then the corresponding virtual eNB queries the database with the UE identifier supplied by the UE during the reconnection procedure, and fetches the corresponding UE context, even if the further eNB has not been prepared for that UE by the serving eNB. Hence, even unprepared eNBs can resume communication with that UE.

This database can be very small with respect to memory and processing capabilities, as in principle only pointers to the UE context have to be stored. The pointers track towards the respective UE contexts stored by the respective serving eNBs.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
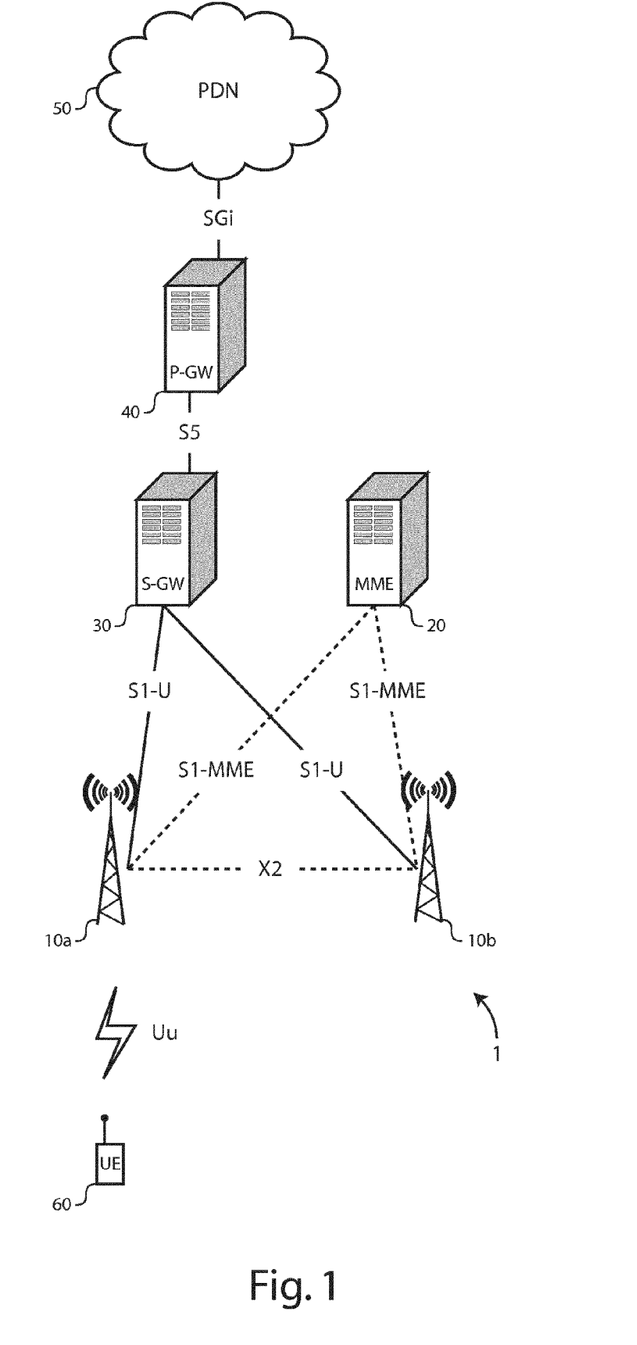
FIG. 1 represents an LTE mobile communication network.

There is seen in FIG. 1 a part 1 of an Evolved Radio Access Network (E-RAN) and of an Evolved Packet Core (EPC) comprising the following network elements:
eNBs 10,
an MME 20,
a Serving Gateway (S-GW) 30,
a Packet Data Network (PDN) Gateway (P-GW) 40, and
a UE 60.

The eNBs 10 are coupled to the MME 20 through an S1-MME interface, and to the S-GW 30 through an S1-U interface. The S-GW 30 is further coupled to the P-GW 40 through an S5 interface. The P-GW 40 is further coupled to a PDN 50 through an SGi interface. The neighboring eNBs 10 establish neighbor relationships through an X2 interface.

The eNBs 10 operate macro, micro or pico cells with a radio coverage area ranging from a few kilometers up to a few tens meters. The eNBs 10 are configured to set up and operate a radio communication channel (i.e., a set of downlink and uplink traffic radio resources) with the UE 60 through a Uu radio interface.

More noticeably, each of the eNBs 10 hosts the following functions:
Radio Resource Control (RRC): radio bearer control, radio admission control, connection mobility control, dynamic allocation of resources to UEs in both uplink and downlink (scheduling);
Routing of user-plane data towards the S-GW;
Scheduling and transmission of paging messages from the MME;
Scheduling and transmission of broadcast information;
Measurement and measurement reporting configuration for mobility and scheduling.

The MME 20 hosts the following functions:
Non Access Stratum (NAS) signaling;
Idle mode UE reachability, including control and execution of paging retransmission;
Tracking Area (TA) list management for UE in idle and active mode;
S-GW selection;
MME selection for inter-MME handovers;
Roaming;
Authentication;
Bearer management functions including dedicated bearer establishment.

The S-GW 30 hosts the following functions:
Local mobility anchor point for inter-eNB handover;
E-UTRAN idle mode downlink packet buffering and initiation of network triggered service request procedure;
Lawful interception;
Packet routing and forwarding;
Transport level packet marking in the uplink and the downlink;
downlink and uplink charging per UE, PDN, and Quality of Service (Qos) Class Identifier (QCI).

The P-GW 40 hosts the following functions:
UE IP address allocation and IP anchor point;
Per-user based packet filtering (e.g., by means of deep packet inspection);
Lawful interception;
Downlink and uplink service level charging, gating and rate enforcement.

Figure 2:
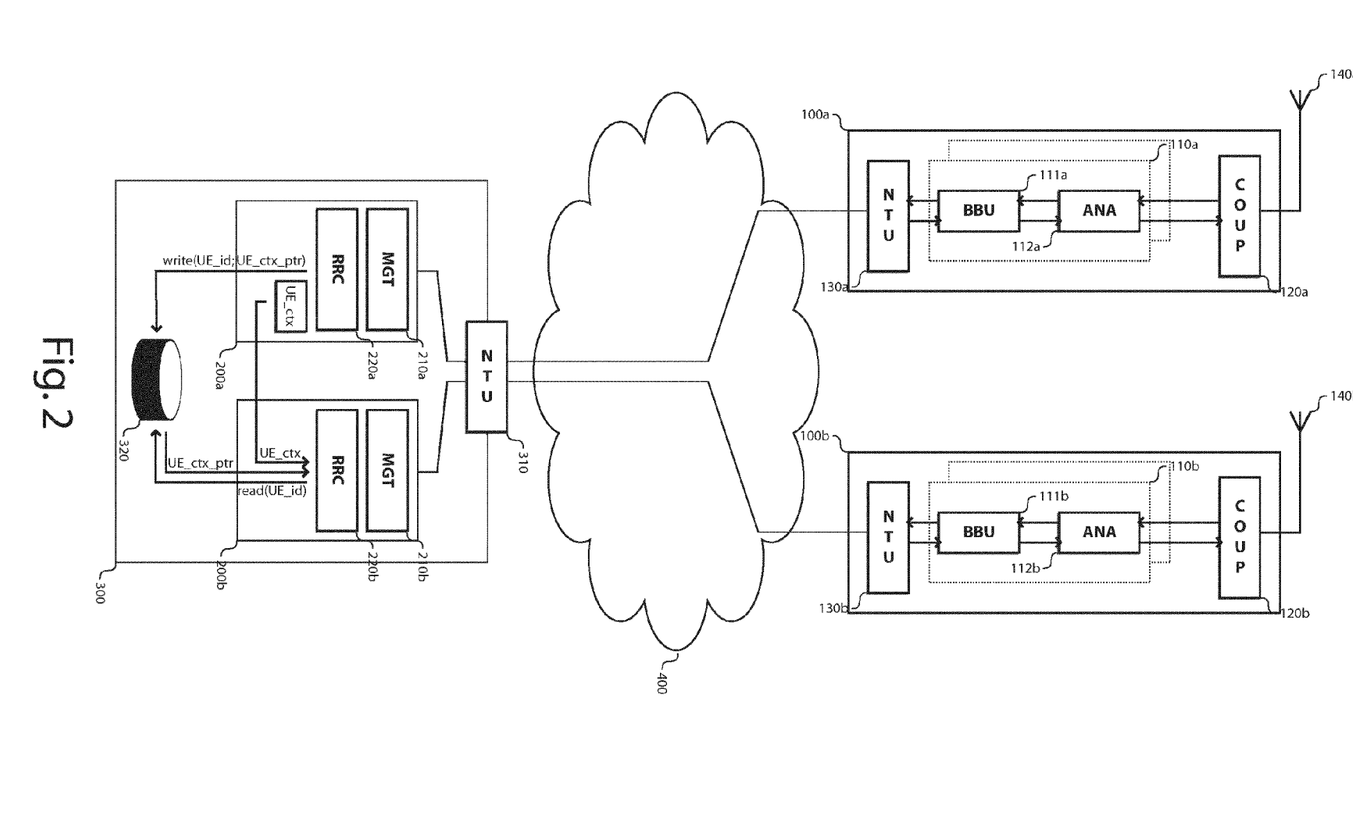
FIG. 2 represents a light-radio platform as per the invention.

There is seen in FIG. 2 further details about a light radio platform as per the invention.

As an exemplary embodiment, the light radio platform is shown as comprising two eNBs. The eNBs are split into two functional parts 100 and 200. The first part 100, further referred to as a physical eNB, comprises embedded eNB functions to be run within a radio access node equipment close to the antenna, whereas the second part 200, further referred to as a virtual eNB, comprises generic eNB functions to be run on a generic computer platform 300 as respective process instances.

Each of the physical eNBs 100 hosts interalia the following functions:
one or more transceivers 110, each one comprising a digital base-band unit 111 (or BBU), and an analog band-pass unit 112 (or ANA),
a coupling unit 120 (or COUP), and
a network termination unit 130 (or NTU) for connecting to a PDN 400.

The network termination unit 130 is bi-directionally coupled to the digital base-band unit 111; the digital base-band unit 111 is bi-directionally coupled to the analog band-pass unit 112; the analog band-pass unit 112 is bi-directionally coupled to the coupling unit 120; and the coupling unit 120 is coupled to an external or internal antenna 140.

Each of the virtual eNBs 200 hosts interalia the following functions:
a radio access node manager 210 (or MGT), and
a radio resource controller 220 (or RRC).

The computer platform 300 further comprises a network termination unit 310 for connecting to the PDN 400. The physical eNBs 100 are in peer-to-peer communication with respective ones of the virtual eNBs 200 through the PDN 400.

The computer platform 300 further comprises a data repository 320, wherein the UE contexts of all UEs in handover process are held. The data repository 320 is accessible to all the virtual eNBs of the computer platform 300 for both read and write access.

The computer platform 300 can be implemented by means of the so-called cloud computing paradigm, whereby a set of processes is run within a single virtual execution environment irrespective of their actual physical location and specifics within the cloud. Cloud computing offers high scalability and resilience to computer applications.

The transceivers 110 are configured to establish and operate radio communication channels with UEs under control of the radio resource controller 220.

The digital base-band unit 111 is for digitally processing the received and transmit data symbols. The digital base-band unit 111 implements the necessary protocol suites for issuing, terminating or relaying data and control packets.

The analog band-pass unit 112 is for modulating, amplifying and shaping the transmit signal that ultimately feds the antenna 140, and for filtering, amplifying with as little noise as possible and demodulating the received signal from the antenna 140. The analog band-pass 112 unit can be merged with the digital base-band unit, or can be moved closer to the antenna in a so-called Remote Radio Head-end (RRH) configuration.

The coupling unit 120 is for combining and passing the transmit signals from the transceivers 110 towards the antenna 140, and for dispatching the receive signal from the antenna 140 towards the transceivers 110.

The network termination units 130 and 310 accommodate the appropriate Medium Access Control (MAC) and Physical transport (PHY) layers for connecting to the PDN 400, as well as some frame dispatching logic for routing the incoming/outgoing frames towards the appropriate Input/Output (I/O) ports.

The radio access node manager 210 is for configuring and managing the eNBs.

The radio resource controller 220 is for assigning and managing downlink and uplink radio resources used by the transceivers 110 and the respective UEs for radio communication over the air interface, that is to say a set of time and/or frequency resources assigned to the respective Radio Access Bearers (RAB) for transport of user traffic.

Radio Resource Management (RRM) is the system level control of co-channel interference and other radio transmission characteristics in mobile communication systems. RRM involves strategies and algorithms for controlling parameters such as the transmit power, the channel allocation, the handover criteria, the modulation scheme, the error coding scheme, etc. The objective is to utilize the limited radio spectrum resources and radio network infrastructures as efficiently as possible.

RRM is especially important in systems limited by co-channel interference rather than by noise, for example in networks consisting of many adjacent access points that may reuse the same channel frequencies.

The objective of RRM is therefore to maximize the system spectral efficiency while guaranteeing a certain grade of service. The latter involves covering a certain area and avoiding outage or impairments due to co-channel interference, noise, attenuation caused by long distances, fading caused by shadowing and multi-path, Doppler shift and other forms of distortion. The grade of service is also affected by blocking due to admission control, scheduling starvation or inability to guarantee the requested Qos.

Dynamic RRM schemes adaptively adjust the radio network parameters to the traffic load, user positions, QoS requirements, etc. Dynamic RRM schemes are considered in the design of wireless or mobile networks, in view to minimize expensive manual cell planning and achieve tighter frequency reuse patterns, resulting in improved system spectral efficiency. Some schemes are centralized, others are distributed, either autonomous algorithms in eNBs and UEs, or coordinated algorithms by exchanging information between eNBs.

Examples of dynamic RRM schemes are power control algorithms, link adaptation algorithms, Dynamic Channel Allocation (DCA) or Dynamic Frequency Selection (DFS) algorithms, traffic adaptive handover, adaptive filtering (e.g., single Antenna Interference Cancellation (SAIC)), dynamic diversity schemes (e.g., soft handover, phased array antenna with beam-forming and/or Multiple-Input Multiple-Output (MIMO) communications and/or space-time coding), admission control, dynamic bandwidth allocation using resource reservation multiple access schemes or statistical multiplexing, cognitive radio, etc.

The radio resource controller 220 is further configured to push UE identity and context information into the data repository 320 for any UE for which a handover procedure is on-going (see "write(UE_id; UE_ctx_ptr)" in FIG. 2).

The UE identity information comprises a temporary UE identifier UE_id used for call resumption by the UE if any. The UE identifier UE_id comprises the C-RNTI assigned to the UE by the serving eNB, the PCI of the serving cell, and the short MAC-I used in the serving cell. The UE context information comprises a pointer UE_ctx_ptr towards a memory area wherein the actual UE context UE_ctx is stored and maintained up-to-date by the serving eNB. The UE context UE_ctx comprises interalia the UE X2 signaling context reference, the UE S1 EPC signaling context reference, and the characteristics of the established RAB(s) for that UE.

Alternatively, the radio resource controller 220 may push the whole UE context UE_ctx directly into the data repository 320, although this solution is less memory efficient.

The radio resource controller 220 is further configured to query the data repository 320 whenever a request for reconnection is received from a UE, and for which no context information is available. The data repository 320 is queried with the temporary UE identifier UE_id supplied by the UE during the reconnection procedure, and assigned by the previously serving eNB (see "read(UE_id)" in FIG. 2). The data repository 320 returns a pointer UE_ctx_ptr tracking the place where the UE context UE_ctx for the UE identifier UE_id is stored and maintained up-to-date by the previously serving eNB. The radio resource controller 220 then fetches the whole UE context UE_ctx directly from the pointer-referred memory area. If no context is found for that UE identifier, the data repository 300 returns a NULL pointer or alike.

Figure 3:
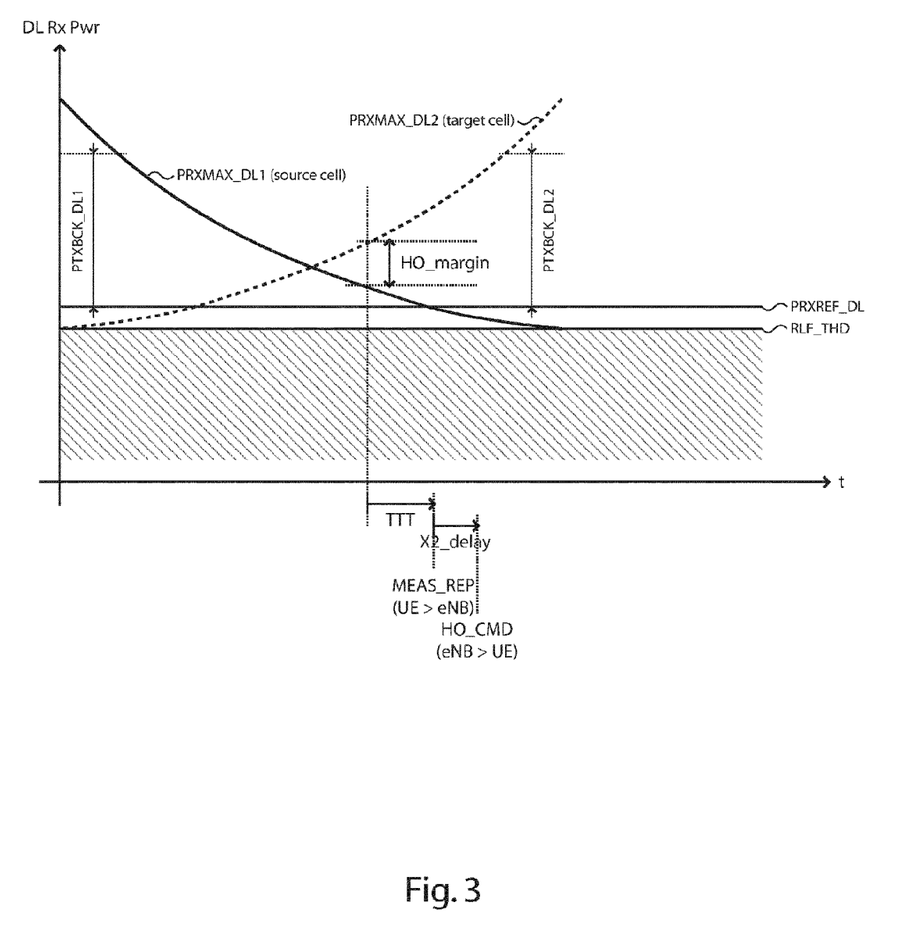
FIG. 3 represents a plot of receive signal power for a UE moving from one cell to another.

There is seen in FIG. 3 a plot of the downlink receive signal power (DL Rx Pwr) as measured over time (t) by a UE moving from the coverage area of a source cell to the coverage area of a target cell.

The receive power, as measured over time by the UE, of a downlink reference signal transmitted at a first nominal transmit power level by the source eNB is plotted as a plain curve PRXMAX_DL1. The receive power, as measured over time by the same UE, of a downlink signal transmitted at a second nominal maximum transmit power level by the target eNB is plotted as a dotted curve PRXMAX_DL2.

The reference downlink receive power level for achieving a certain SNIR, and thus a certain QoS, is plotted as a bottom straight line PRXREF_DL. The difference between PRXMAX_DL1 and PRXREF_DL represents the amount of downlink transmit power backoff PTXBCK_DL1 that can be applied by the source eNB for limiting radio interference while achieving an acceptable QoS. The difference between PRXMAX_DL2 and PRXREF_DL represents the amount of downlink transmit power backoff PTXBCK_DL2 that can be applied by the target eNB.

When a downlink communication is established between the source eNB and the UE, and the UE moves away from the source eNB, then the downlink transmit power backoff PTXBCK_DL1 decreases and becomes null at some distance from the source eNB, meaning the maximum transmit power for achieving the required QoS within the source cell is reached. This distance corresponds to the maximum radio coverage reach of the source cell. From this distance outwards, the receive SNIR starts degrading, and the communication session should ideally be switched towards a more suitable neighboring cell by means of a handover procedure. The handover shall take place before the receive signal power hits an RLF reference threshold RLF_THD beyond which radio communication is no longer possible with the source eNB.

When the difference in receive power PRXMAX_DL2−PRXMAX_DL1 is past a predetermined threshold HO_margin for TTT seconds, a handover event A3 is reported by the UE to the serving eNB for triggering a handover procedure towards the target cell (see MEAS_REP(UE>eNB) in FIG. 3). It takes some time X2_delay for the target eNB to be prepared and for the UE to receive the handover command to switch to the target cell (see HO_CMD(eNB>UE) in FIG. 3).

If signal fading is too fast, and if signal goes below the RLF reference threshold RLF_THD, the UE may be unable to report the HO event, meaning no cell will be prepared for that UE and no handover takes places, or the UE may not receive the handover command, meaning that one or more target cells are prepared but no handover takes places. In both cases, the UE shall use the RRC reconnection procedure to resume the communication session with the source eNB, or with a further eNB that offers the best radio signal quality.

Figure 4:
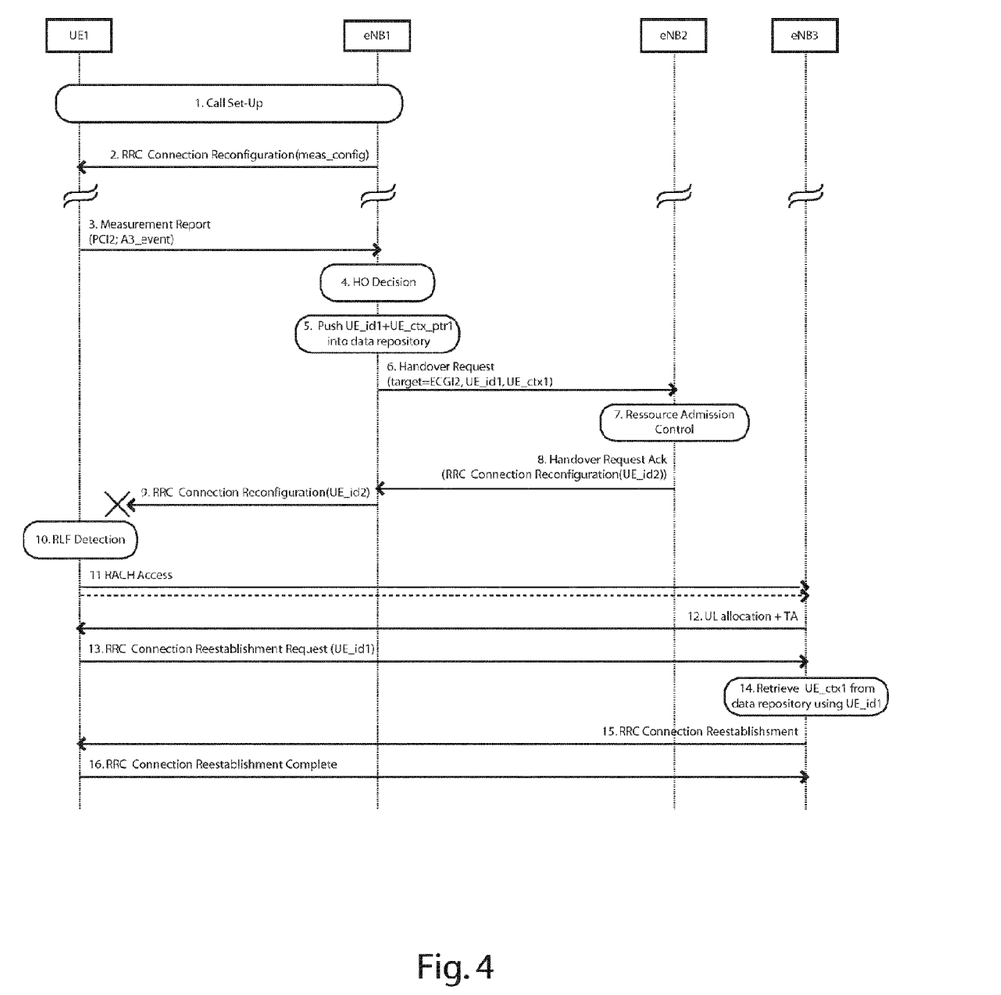
FIG. 4 represents a message flow chart for a handover failure followed by a radio connection reestablishment with an unprepared eNB as per the invention.

There is seen in FIG. 4 a message flow chart representing the most noticeable signaling exchanges between a UE UE1 and three eNBs eNB1, eNB2 and eNB3. The three eNBs eNB1, eNB2 and eNB3 are implemented on a single light radio platform as per FIG. 2, that is to say their radio resource controllers and further generic functions run as respective virtual eNBs over a common computer platform, while their baseband processing part and analog part run on remote physical radio access node equipment. The computer platform further holds a data repository for storing the UE contexts of all UEs in handover process.

Within the coverage area of a first serving cell C1 operated by an eNB eNB1, a UE UE1 establishes a radio communication session with the serving eNB eNB1. The serving cell C1 has PCI1 as PCI, and ECGI1 as E-UTRAN Cell Global Identifier (ECGI). After random access, the UE UE1 starts exchanging signaling messages with the eNB eNB1 for establishing downlink and uplink RABs for L1 transport of user traffic (see "1. Call Set-Up" in FIG. 4). The UE UE1 then enters RRC_CONNECTED state. Within the cell C1, the UE UE1 is assigned a temporary UE identifier UE_id1 and has a call context UE_ctx1.

The eNB eNB1 further sends a RRC CONNECTION RECONFIGURATION message to the UE UE1, whereby the UE UE1 is configured with an ad-hoc measurement policy meas_config (see "2. RRC Connection Reconfiguration(meas_config)" in FIG. 4). More specifically, the UE UE1 is configured with a handover event A3 (neighbor cell becomes offset better than serving cell) comprising a generic offset parameter OFF for triggering the event condition A3, a hysteresis HYS for entering and leaving the event condition A3, and a TTT period during which the event condition A3 shall be fulfilled before reporting the event to the eNB eNB1.

The UE UE1 measures signal strength and/or signal quality from neighboring cells, and compares them with the respective handover thresholds. When moving away from the eNB1, the UE UE1 leaves the radio coverage area of the cell C1, and enters the radio coverage area of another cell C2. The cell C2 has PCI2 as PCI, and ECGI2 as ECGI. The UE UE1 detects the measured power of C2 reference signal as fulfilling the condition A3. Consequently, and provided this condition is fulfilled during TTT seconds, the UE UE1 sends a MEASUREMENT REPORT message to the source eNB eNB1 for notifying a handover event A3 towards the target cell C2 (see "3. Measurement Report(PCI2, A3_event)" in FIG. 4).

Thereupon, the serving eNB eNB1 makes a decision whether to perform a handover for the UE UE1 from the source cell C1 towards the target cell C2 based on further RRM criterion (see "4. HO Decision" in FIG. 4).

The source eNB eNB1 decides to handover the UE UE1 towards the cell C2, and sends a HANDOVER REQUEST message to the target eNB eNB2 operating the cell C2 via an X2 interface (see "6. Handover Request(target=ECGI2, UE_id1, UE_ctx1" in FIG. 4).

The HANDOVER REQUEST message comprises, as noticeable Information Elements (IE), the EGCI ECGI2 of the target cell C2, the temporary UE identifier UE_id1 assigned by the source eNB eNB1 in the source cell C1 and used for call resumption by the UE UE1 if any, and the call context UE_ctx1 of the UE UE1 within the source cell C1.

While sending the HANDOVER REQUEST message, the source eNB eNB1 also pushes the UE identifier UE_id1, and a pointer UE_ctx_ptr1 towards the memory area wherein the UE context UE_ctx1 is stored and maintained up-to-date by the source eNB eNB1, into the data repository (see "5. push UE_id1+UE_ctx_ptr1 into data repository" in FIG. 4).

After resource admission control (see "7. Resource Admission Control" in FIG. 4), the target eNB eNB2 reserves the necessary downlink and uplink RABs, and sends a HANDOVER REQUEST ACK message back to the source eNB eNB1, which message including a RRC CONNECTION RECONFIGURATION container to be passed transparently by the source eNB eNB1 to the UE UE1 as an RRC message. The RRC CONNECTION RECONFIGURATION comprises a new UE identifier UE_id2 assigned by the target eNB eNb2 and to be used by the UE UE1 within the target cell C2 (see "8. Handover Request Ack(RRC Connection Reconfiguration(UE_id2))" and "9 RRC Connection Reconfiguration(UE_id2)" in FIG. 4).

Presently, on account of fast signal fading, the UE UE1 does not receive the RRC CONNECTION RECONFIGURATION message, and further detects an RLF condition as it moves away from the source cell C1 (see "10. RLF Detection" in FIG. 4).

Consequently, the UE UE1 tries to resume communication with the radio cell that offers the best radio signal quality, presently another cell C3 operated by another eNB eNB3 that has not been prepared by the source eNB eNB1 to accept the UE UE1.

After random access (see "11 RACH Access" and "12. UL Allocation+TA" in FIG. 4), the UE UE1 sends a RRC CONNECTION REESTABLISHMENT REQUEST message to the eNB eNB3. The message comprises the UE identifier UE_id1 assigned by the source eNB eNB1 in the source cell C1 (see "13. RRC Connection Reestablishment Request(UE_id1)" in FIG. 4).

As no UE context is available for the UE UE1 within the eNB eNB3, the eNB eNB3 queries the data repository with the UE identifier UE_id1, and retrieves the UE context pointer UE_ctx_ptr1, and further the UE context UE_ctx1 as stored by the eNB eNB1 (see "14. Retrieve UE_ctx1 from data repository using UE_id1" in FIG. 4). Hence, the eNB3 can accept the request for reconnection from the UE UE1, and replies with a RRC CONNECTION REESTABLISHMENT message (see "15. RRC Connection Reestablishment" in FIG. 4). Eventually, the UE UE 1 answers with a RRC CONNECTION REESTABLISHMENT COMPLETE message, and the UE UE1 remains in RRC_CONNECTED state, meaning the call is maintained although the eNB eNB3 was not prepared for that UE by the eNB eNB1 (see "16. RRC Connection Reestablishment Complete" in FIG. 4).

Also, if the UE UE1 attaches to still a further eNB eNB4, whose virtual eNB run on a second light radio platform, the virtual eNB eNB4 requests the UE context from the database of the first light radio platform running the virtual eNB that controls the source eNB eNB1. The address of this database can be obtained from the PCI PCI1 of the source eNB eNB1 by e.g. querying a directory service, or from locally configured data. The remote database queries can be sent to e.g. a private port supporting a given set of message primitives, and open for all the light radio platforms.

Depending on the processing and storage capacity of the light radio platform, there might be a second database which points to the contexts of all active UEs. In case there is a coverage hole (e.g., tunnel, shadowing from a large building, wrong network planning), the UE will suffer an RLF without being in a handover procedure, i.e. there will not be any MEASUREMENT REPORT message received by the source eNB. 3GPP has defined this as a handover failure "too early" or handover failure to "wrong cell". As long as the second RLF phase is running, the UE will sent out the RRC CONNECTION REESTABLISHMENT REQUEST message, and again the addressed eNB will fetch the UE context from the database based on the pointers towards all the active UEs within the light radio platform. Again, no call drop will occur.

Although the above description has made exhaustive references to LTE technology and terminology, the present invention is equally advantageous for other mobile or wireless communication technologies such as Global System Mobile (GSM), Code Division multiple Access (CDMA), universal mobile Terrestrial System (UMTS), etc.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A radio resource controller for controlling radio resources of a serving radio access node, and configured to assign particular radio resources of the serving radio access node to a radio communication session established between the serving radio access node and a particular mobile station,
   wherein the radio resource controller is further configured to push a radio communication session information of the radio communication session into a common data repository accessible in read and write access to both the radio resource controller and a further radio resource controller controlling radio resources of a further radio access node,
   wherein the session information comprise a mobile identifier that may be used by the particular mobile station for resumption of the radio communication session,
   wherein the session information further allow retrieval of contextual communication parameters used by the serving radio access node for radio communication with the particular mobile station during the radio communication session,
   wherein the radio resource controller is configured to run on a computer platform together with the further radio resource controller, and
   wherein the computer platform further holds the common data repository and is remotely coupled via a packet data network to the serving radio access node and to the further radio access node.

2. The radio resource controller according to claim 1, wherein the session information are pushed into the common data repository upon establishment of the radio communication session with the particular mobile station.

3. The radio resource controller according to claim 1, wherein the session information are pushed into the common data repository upon detection of a handover condition for the particular mobile station.

4. The radio resource controlling arrangement according to claim 1, wherein the radio resource controller and the further radio resource controller share a common address space,
   and wherein the session information further comprise a memory pointer towards a memory area of the common address space wherein the contextual communication parameters are stored by the radio resource controller.

5. A method for controlling radio resources of a serving radio access node, and comprising, by a radio resource controller, assigning particular radio resources of the serving radio access node to a radio communication session established between the serving radio access node and a particular mobile station,
- wherein the method further comprises, by the radio resource controller, pushing a radio communication session information of the radio communication session into a common data repository accessible in read and write access to both the radio resource controller and a further radio resource controller controlling radio resources of a further radio access node,
- wherein the session information comprise a mobile identifier that may be used by the particular mobile station for resumption of the radio communication session,
- wherein the session information further allow retrieval of contextual communication parameters used by the serving radio access node for radio communication with the particular mobile station during the radio communication session,
- wherein the method further comprises running the radio resource controller on a computer platform together with the further radio resource controller, and
- wherein the computer platform further holds the common data repository and is remotely coupled via a packet data network to the serving radio access node and to the further radio access node.

* * * * *